US00RE50237E

(19) United States
(12) Reissued Patent
Bauer et al.

(10) Patent Number: US RE50,237 E
(45) Date of Reissued Patent: Dec. 17, 2024

(54) WALLET

(71) Applicant: THREAD WALLETS LLC, Provo, UT (US)

(72) Inventors: Colby S. Bauer, Provo, UT (US); McKenzie K. Bauer, Provo, UT (US)

(73) Assignee: THREAD WALLETS LLC, Provo, UT (US)

(21) Appl. No.: 29/849,109

(22) Filed: Aug. 8, 2022

Related U.S. Patent Documents

Reissue of:
(64) Patent No.: Des. 903,312
Issued: Dec. 1, 2020
Appl. No.: 29/701,500
Filed: Aug. 12, 2019

(51) LOC (14) Cl. ..... 03-01
(52) U.S. Cl.
USPC ..... D3/247; D3/300
(58) Field of Classification Search
USPC .... D13/107–108, 103, 119; D14/217, 238.1, D14/240, 248, 250, 251–253, 439, 440, D14/447; D3/201, 269, 273, 301, 218, D3/247, 249, 303
CPC .. H04B 1/3888; H04B 1/0283; H04B 1/0202; A45C 1/06; A45C 11/00; A45C 13/02; A45C 2011/002; A45F 2005/026; A45F 2200/0525; A45F 2200/0516
See application file for complete search history.

(56) References Cited

U.S. PATENT DOCUMENTS 175,822 A 4/1876 Conlan
501,431 A 7/1893 Lambert
(Continued)

FOREIGN PATENT DOCUMENTS

CA 2946972 5/2017
CA 3023429 11/2017
(Continued)

OTHER PUBLICATIONS

Final Office Action received for U.S. Appl. No. 16/983,884, dated Dec. 19, 2022, 31 pages.
(Continued)

*Primary Examiner* — Darlington Ly
(74) *Attorney, Agent, or Firm* — Workman Nydegger

(57) CLAIM

The ornamental design for a wallet, as shown and described.

DESCRIPTION

*The present application is a broadening reissue of U.S. Pat. No. D. 903,312 filed Aug. 12, 2019, issued on Dec. 1, 2020, and entitled "Wallet."*

FIG. 1 is a top, facing, left perspective view of *a first embodiment of* our new design for a wallet;
FIG. 2 is a top plan view thereof;
FIG. 3 is a bottom plan view thereof;
FIG. 4 is an elevated facing view thereof;
FIG. 5 is an elevated rear view thereof;
FIG. 6 is an elevated left side view thereof; and
FIG. 7 is an elevated right side view thereof;
*FIG. 8 is a top, facing, left perspective view of a second embodiment of our new design for a wallet;*
*FIG. 9 is a top plan view thereof;*
*FIG. 10 is a bottom plan view thereof;*
*FIG. 11 is an elevated facing view thereof;*
*FIG. 12 is an elevated rear view thereof;*
*FIG. 13 is an elevated left side view thereof; and,*
*FIG. 14 is an elevated right side view thereof.*

Dotted lines of equal length shown in the Figures represent stitching that forms part of the claimed design. Dotted lines of alternating long and short dashes represent [unclaimed subject matter] *portions of the wallet* that forms no part of the claimed design. [Separation in the drawings show indeterminate length, and the space between separation lines is unclaimed.] *The wallet is shown with a symbolic break in its length. The appearance of any portion of the wallet between the break lines forms no part of the claimed design.*

1 Claim, 6 Drawing Sheets

Figure 1:
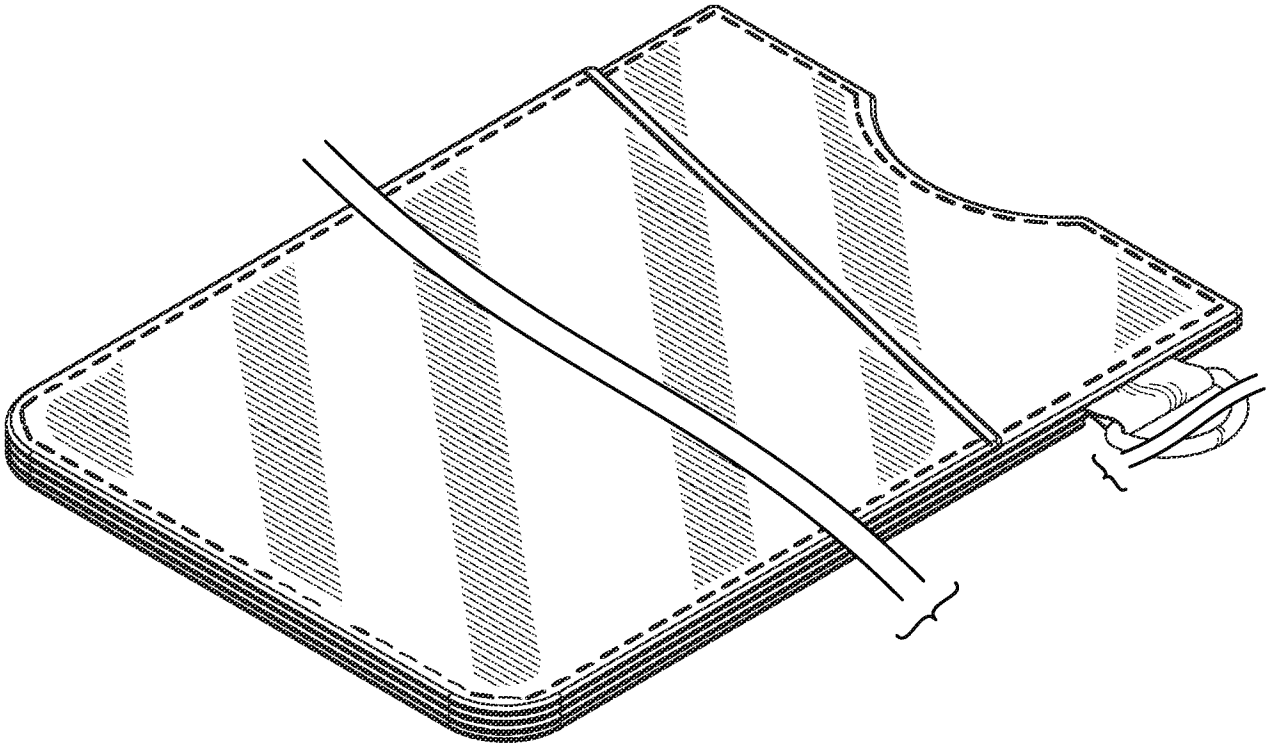
Figure 2:
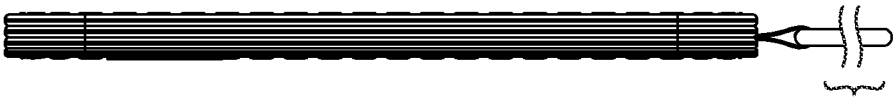
Figure 3:
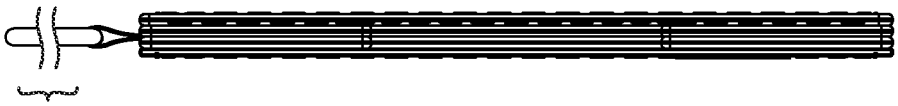
Figure 4:
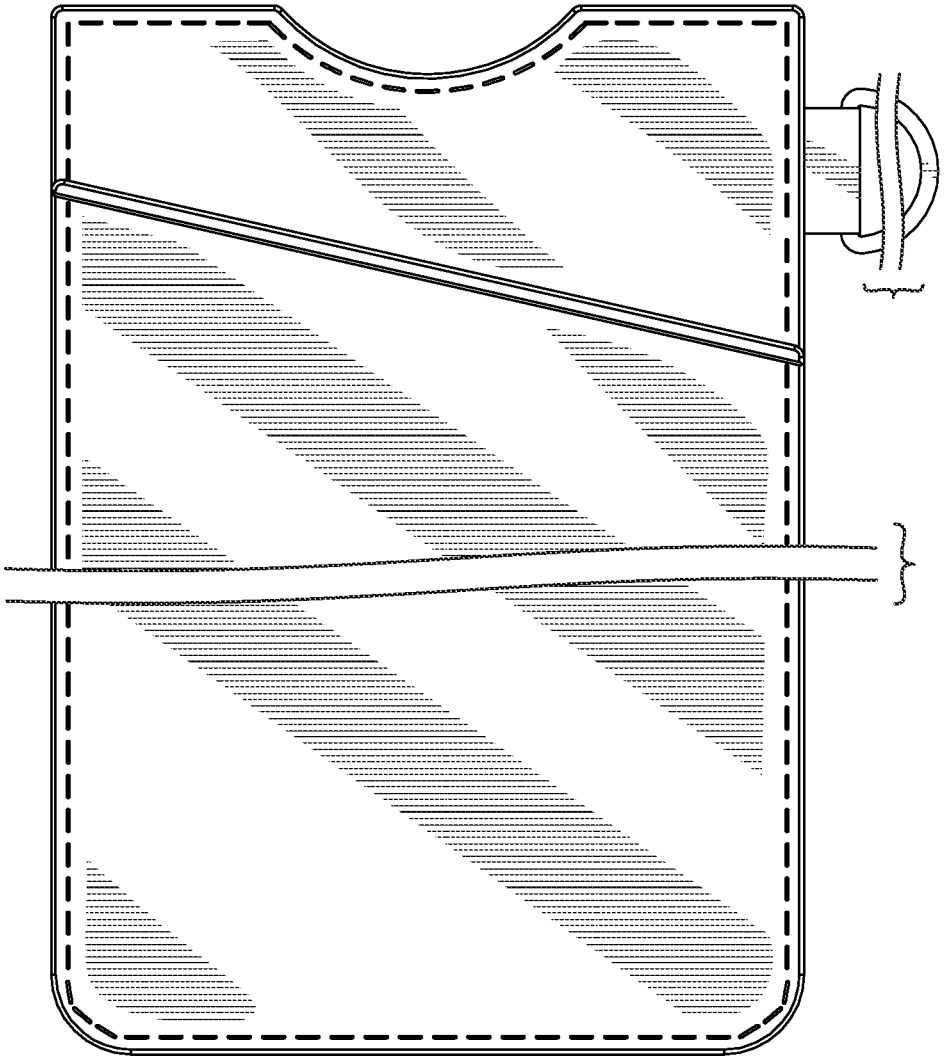
Figure 5:
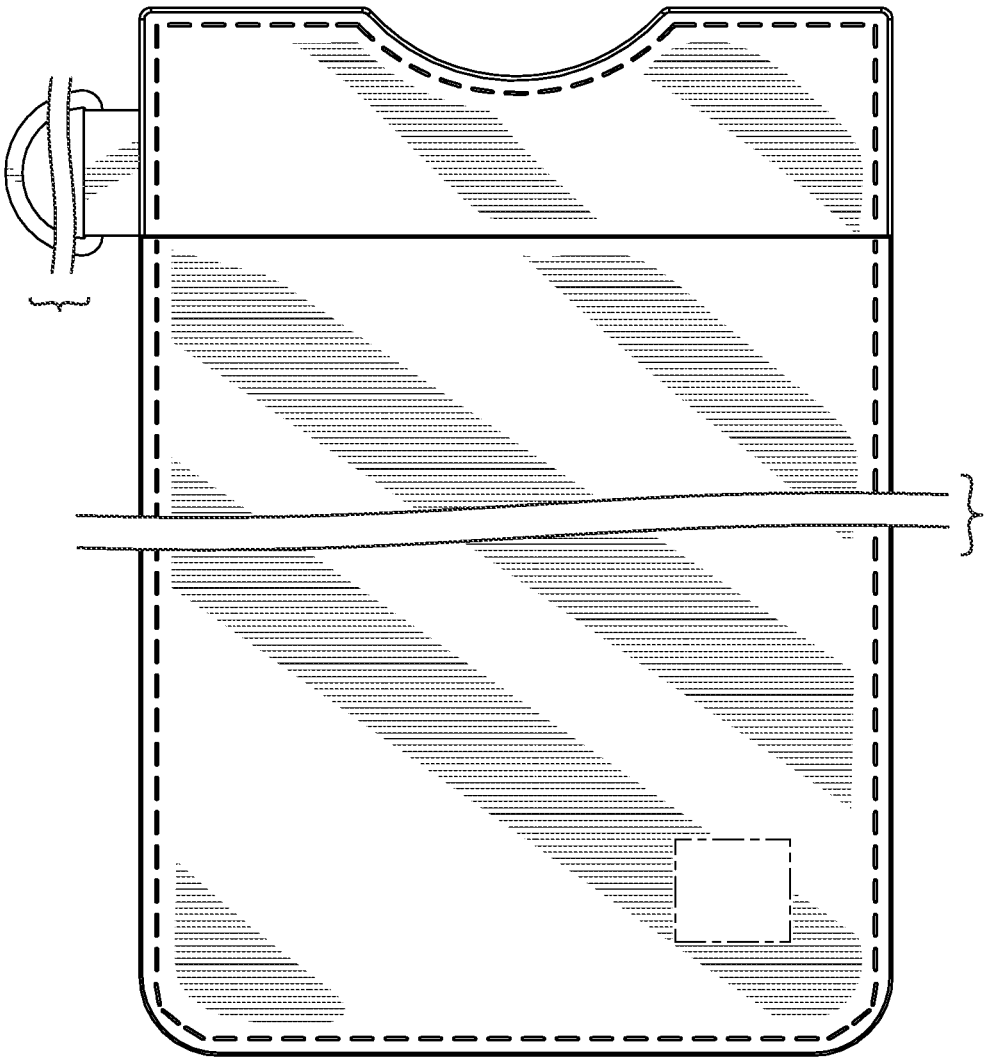
Figure 6:
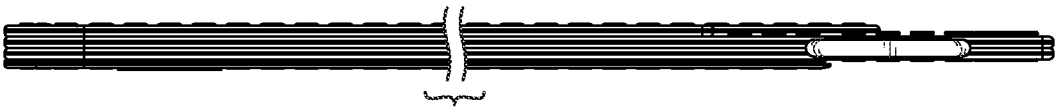
Figure 7:
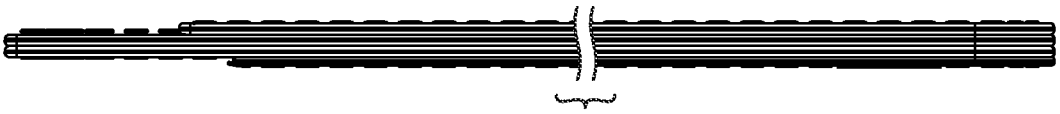

Matter enclosed in heavy brackets [ ] appears in the original patent but forms no part of this reissue; matter printed in italics indicates the additions made by reissue.

(56) References Cited

U.S. PATENT DOCUMENTS

| | | | | |
|---|---|---|---|---|
| 1,110,760 | A | 9/1914 | Easton | |
| 1,423,669 | A | 7/1922 | Charles | |
| 1,619,644 | A | 3/1927 | Wetzel | |
| 1,693,006 | A | 11/1928 | Thomas | |
| 1,699,865 | A * | 1/1929 | Walton | A45C 11/323 206/38.1 |
| 1,782,003 | A | 11/1930 | Epstein | |
| 1,842,870 | A | 1/1932 | Harwood, Jr. | |
| 1,856,703 | A | 5/1932 | Groom | |
| 2,095,593 | A | 10/1937 | Buxton | |
| 2,154,826 | A | 4/1939 | Bernard et al. | |
| 2,288,704 | A | 7/1942 | Herbener | |
| 2,556,310 | A | 6/1951 | Whitmer | |
| 2,609,025 | A | 9/1952 | Tolbert | |
| 2,788,041 | A * | 4/1957 | Carver | A45C 11/182 |
| 2,796,904 | A | 6/1957 | Joseph | |
| 3,162,227 | A | 12/1964 | Joseph | |
| 3,444,914 | A | 5/1969 | French et al. | |
| 3,446,260 | A | 5/1969 | Osher | |
| 3,470,931 | A | 10/1969 | Ervin | |
| 3,856,063 | A | 12/1974 | Dengel | |
| D272,016 | S | 1/1984 | Blair | |
| 4,671,332 | A | 6/1987 | McPhee | |
| D307,979 | S | 5/1990 | Purvis | |
| D336,565 | S | 6/1993 | Wenk | |
| D338,103 | S | 8/1993 | Eschmann | |
| D340,355 | S | 10/1993 | Little | |
| 5,308,308 | A | 5/1994 | Bauman | |
| D370,119 | S | 5/1996 | McDaniel | |
| D380,009 | S | 6/1997 | Pycher | |
| D385,417 | S | 10/1997 | White et al. | |
| D411,765 | S | 7/1999 | Holihan | |
| 5,944,080 | A | 8/1999 | Podwika | |
| D433,804 | S | 11/2000 | Kojoori | |
| D436,252 | S | 1/2001 | Gribovsky | |
| D436,724 | S | 1/2001 | Kojoori | |
| D438,373 | S | 3/2001 | Riley | |
| 6,435,236 | B2 | 8/2002 | Gribovsky | |
| D471,008 | S | 3/2003 | Dubone | |
| D474,017 | S | 5/2003 | Burns | |
| 6,619,349 | B2 | 9/2003 | Gribovsky | |
| D499,547 | S * | 12/2004 | Brown | D3/273 |
| D502,596 | S | 3/2005 | Smoot | |
| D527,891 | S | 9/2006 | Hoeksema | |
| D575,569 | S * | 8/2008 | Martinetti | D3/300 |
| D593,749 | S | 6/2009 | Holzner et al. | |
| 7,546,860 | B1 | 6/2009 | Mehdizadeh | |
| D596,392 | S | 7/2009 | Cohen | |
| D600,011 | S | 9/2009 | Munroe | |
| 7,604,028 | B2 | 10/2009 | Bridgefarmer | |
| D609,457 | S | 2/2010 | Blanford et al. | |
| D627,965 | S | 11/2010 | Berck | |
| D677,053 | S * | 3/2013 | Lyons | D3/300 |
| D694,007 | S | 11/2013 | D'Amore et al. | |
| D716,049 | S * | 10/2014 | Fair | D3/303 |
| D736,520 | S * | 8/2015 | Gross | D3/300 |
| D782,189 | S | 3/2017 | Bauer et al. | |
| D782,190 | S | 3/2017 | Bauer et al. | |
| D833,143 | S | 11/2018 | Dechant | |
| D846,280 | S * | 4/2019 | Bo | D3/303 |
| 10,420,403 | B1 * | 9/2019 | Calder | A45C 1/06 |
| D863,761 | S * | 10/2019 | Bermond | D3/247 |
| D866,963 | S | 11/2019 | Burko | |
| 10,506,857 | B2 * | 12/2019 | Altschul | A45C 13/002 |
| D898,353 | S * | 10/2020 | Hagan | D3/247 |
| D903,312 | S * | 12/2020 | Bauer | D3/300 |
| D967,625 | S * | 10/2022 | Akana | D3/247 |
| 2003/0178461 | A1 | 9/2003 | Shattuck | |
| 2005/0035006 | A1 | 2/2005 | Dohner | |
| 2005/0205435 | A1 | 9/2005 | Loy | |
| 2008/0023114 | A1 | 1/2008 | Bridgefarmer | |
| 2011/0030860 | A1 | 2/2011 | Allen et al. | |
| 2013/0037187 | A1 * | 2/2013 | D'Amore | A45C 15/00 150/147 |
| 2013/0276943 | A1 | 10/2013 | Minn et al. | |
| 2015/0335113 | A1 | 11/2015 | Minn et al. | |
| 2016/0073747 | A1 | 3/2016 | Whichel | |
| 2017/0135452 | A1 | 5/2017 | Kane | |
| 2018/0006676 | A1 * | 1/2018 | Zavala | A45C 1/08 |
| 2018/0110305 | A1 | 4/2018 | Kim et al. | |
| 2018/0116352 | A1 | 5/2018 | Despain | |
| 2018/0235338 | A1 | 8/2018 | Lamb et al. | |
| 2018/0332936 | A1 | 11/2018 | Serman | |
| 2020/0229557 | A1 | 7/2020 | Tran et al. | |
| 2022/0031032 | A1 | 2/2022 | Bauer et al. | |

FOREIGN PATENT DOCUMENTS

| | | | |
|---|---|---|---|
| CA | 3023430 | | 11/2017 |
| CA | 3023431 | | 1/2018 |
| CA | 2964570 | | 10/2018 |
| CA | 3071482 | | 2/2019 |
| CA | 3033806 | | 8/2019 |
| CA | 3060799 | | 1/2020 |
| CA | 2994836 | | 6/2020 |
| CA | 3143831 | | 1/2021 |
| CA | 3178512 | | 12/2021 |
| CA | 3125396 | | 2/2022 |
| CA | 3192336 | | 3/2022 |
| CA | 3193828 | | 4/2022 |
| FR | 3026925 | A1 | 4/2016 |
| GB | 6071172 | | 9/2019 |
| KR | 20-0447574 | Y1 | 2/2010 |
| KR | 20-0453314 | Y1 | 4/2011 |
| WO | 2012/169749 | A2 | 12/2012 |
| WO | 2013/040771 | A1 | 3/2013 |

OTHER PUBLICATIONS

"The Leo", Retrieved from https://andar.com/collections/card-holders/products/the-leo, Retrieved on Aug. 2022, 6 Pages.

Crabby Wallet; www.crabbygear.com; accessed Jul. 17, 2015; 1 pg.

Elephant Wallet; www.elephantwallet.com; accessed Jul. 17, 2015; 2 pg.

Leatherboss: https://www.amazon.com/Leather-Credit-Wallet-Drivers-License/dp/B011D8SOLO/ (Year: 2016).

Modern Carry: https://www.amazon.com/Slim-Credit-Wallet-Modern-Carry/dp/B07ZDNC4SP/ (Year: 2016).

Non-Final Office Action received for U.S. Appl. No. 16/983,884, dated Mar. 29, 2022, 20 pages.

Slim Wallet; www.suprgood.com; accessed Jul. 17, 2015; 2 pg.

Thread Wallets 2.0 Slim Wallet For The Stylish Minimalist posted at Kickstarter.com, posting date Mar. 13, 2015, (Copyrights) 2016 Kickstarter.com, [online], [site visited Jul. 27, 2016]. Available from Internet, <URL: https://www.kickstarter.com/projects/798397208/thread-wallets-wallets-that-match-your-lifestyle/description>.

Tight Wallet; www.tightstore.com; accessed Jul. 17, 2015; 3 pg.

VBAX: https://www.amazon.com/dp/B07FZ4GY5W/ (Year: 2018).

Non-Final Office Action received for U.S. Appl. No. 16/983,884, mailed on Mar. 28, 2023, 29 pages.

Office Action received for Canadian Patent Application No. 3125396, mailed on Nov. 14, 2023, 04 pages.

Amazon.com, Site visited Feb. 28, 2024, FOXHACKLE Leather Credit Card Holder Wallet, Date first available, Jul. 8, 2019, https://www.amazon.com/FOXHACKLE-Pocket-Leather-Minimalist-Handmade/dp/B08DNPQC99 (Year: 2019).

Non-Final Rejection Mailed on Mar. 11, 2024 for U.S. Appl. No. 29/865,260, 11 page(s).

Youtube.com, Site visited Feb. 28, 2024, "NOMAD's slim bifold can stop wandering," published by walletopia on May 17, 2019, https://www.youtube.com/watch?v=CZ_KphjyIVU (Year: 2019).

"A Few of the Best Elastic Wallets." Tools and Toys., Jul. 26, 2017 [online], [retrieved on Apr. 19, 2024], Retrieved from the Internet <URL: http://toolsandtoys.net/guides/a-few-of-the-best-elastic-wallets/>.

"Contrast Elastic Card Wallet." Orvis., Feb. 14, 2024 [online], [retrieved on Apr. 19, 2024], Retrieved from the Internet <URL: https://www.orvis.com/product/contrast-elastic-card-wallet/3HPF.html>.

(56) References Cited

OTHER PUBLICATIONS

"Thread Wallets Ultra Slim Card Holder Wallet—Slim Wallet for Women & Men—Minimalist Wallets for Women—Small Wallet for Women & Men—Modern Credit Card Organizer Mini Wallet (Fine Line)." Amazon., Jan. 27, 2024 [online], [retrieved on Apr. 19, 2024]. Retrieved from the Internet <URL: https://www.amazon.com/Thread-Wallets-Minimalist-Wallet-Pocket/dp/B07886LC4F?th=1>.

* cited by examiner

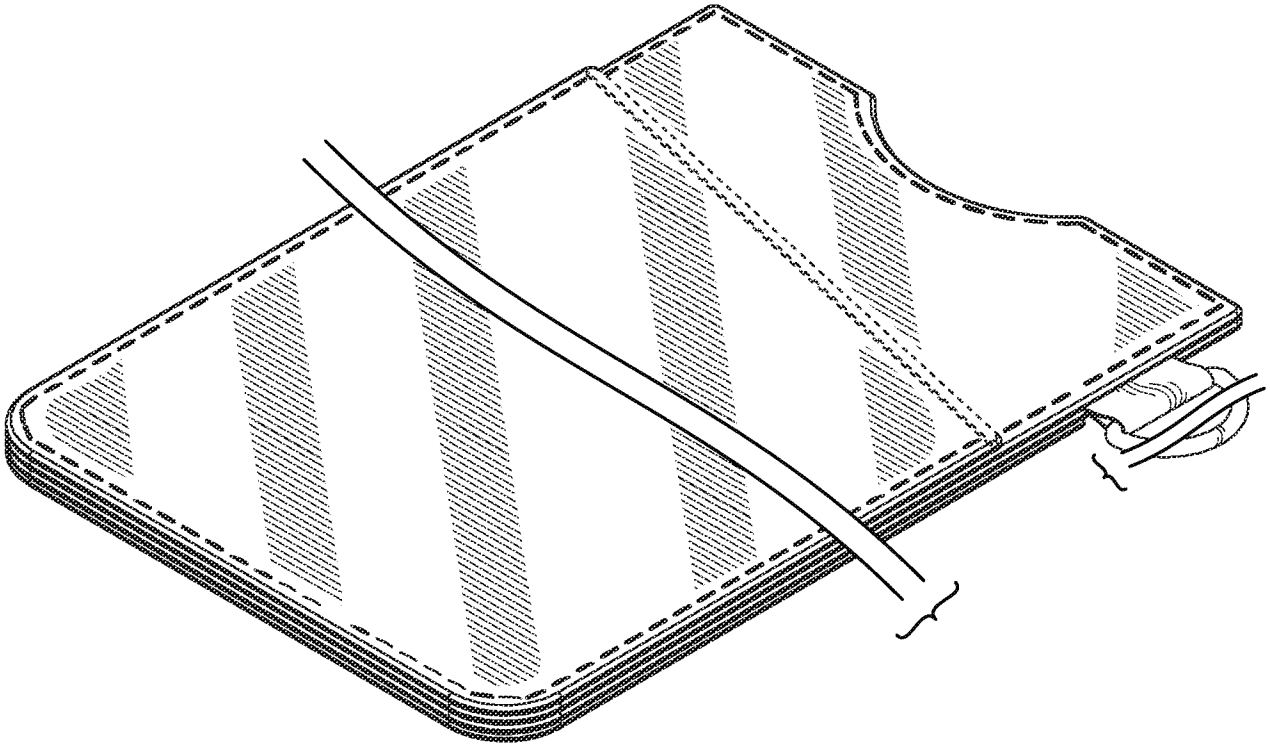
FIG. 8
NEW

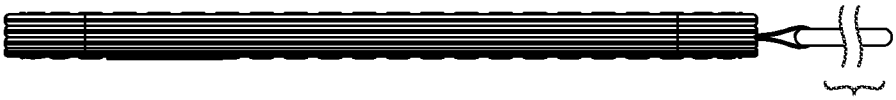
FIG. 9
NEW
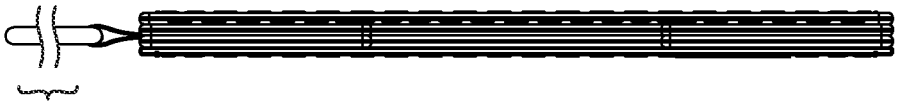
FIG. 10
NEW
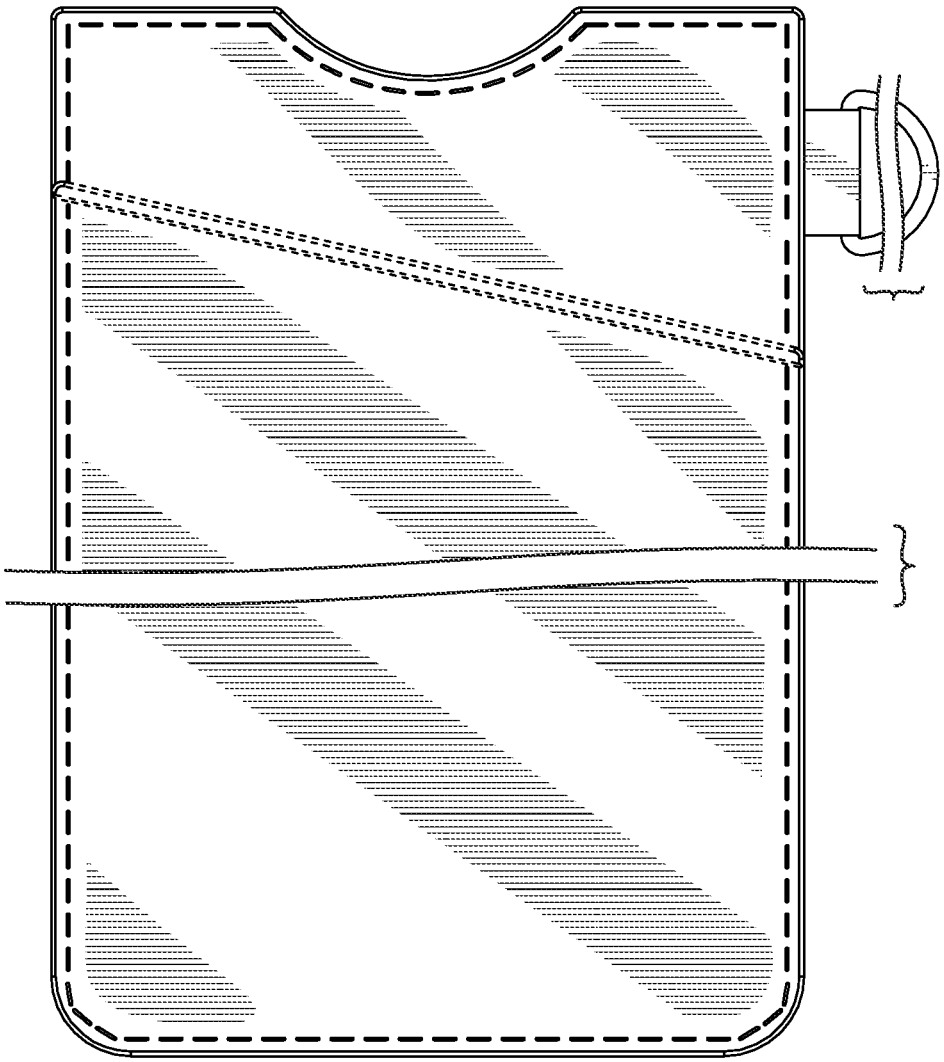
FIG. 11
NEW

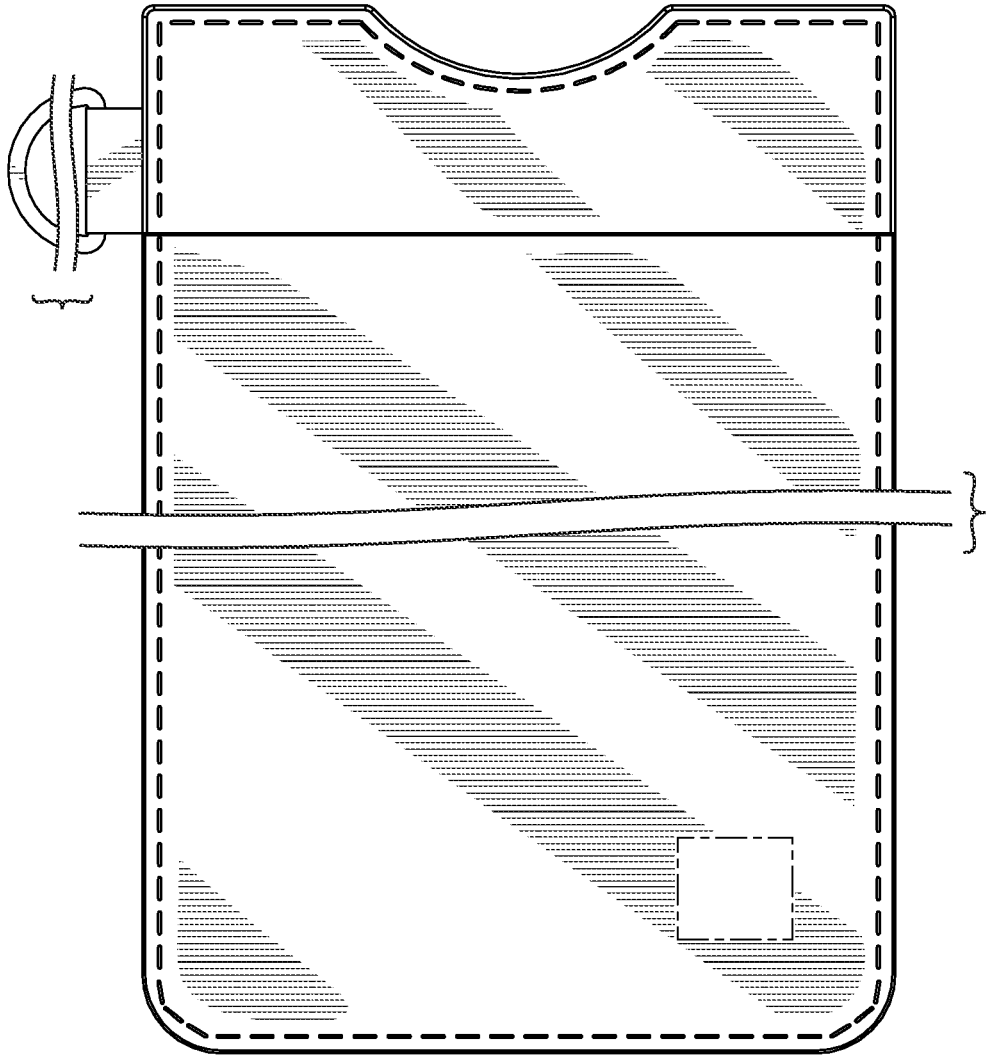
FIG. 12
NEW
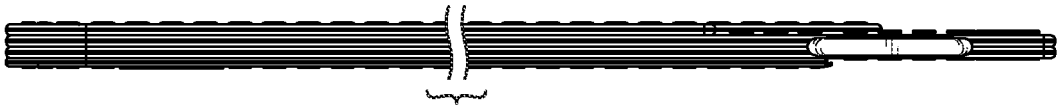
FIG. 13
NEW
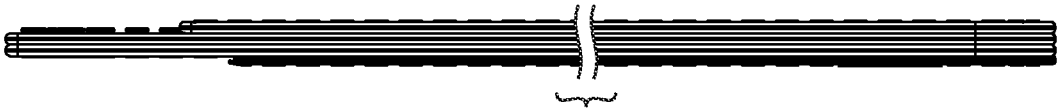
FIG. 14
NEW